No. 807,968. PATENTED DEC. 19, 1905.
P. H. SEERY.
SUSPENSION DEVICE FOR VEHICLES.
APPLICATION FILED JULY 14, 1905.
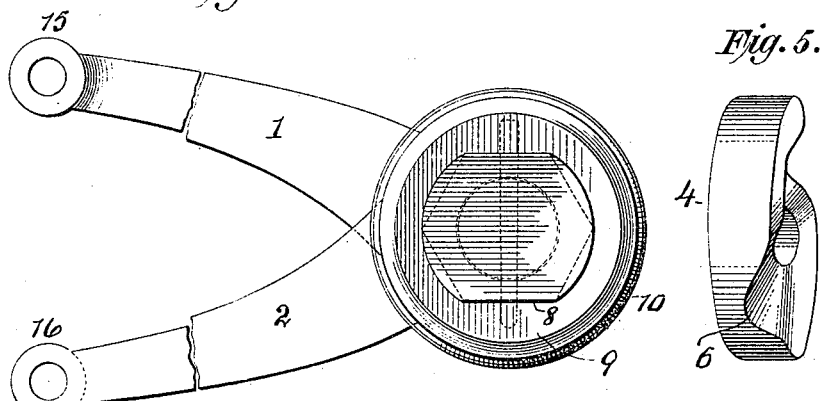

UNITED STATES PATENT OFFICE.

PETER H. SEERY, OF NEWARK, NEW JERSEY.

SUSPENSION DEVICE FOR VEHICLES.

No. 807,968.  Specification of Letters Patent.  Patented Dec. 19, 1905.

Application filed July 14, 1905. Serial No. 269,604.

*To all whom it may concern:*

Be it known that I, PETER H. SEERY, of Newark, Essex county, New Jersey, have invented a new and useful Improvement in Suspension Devices, of which the following is a specification.

The invention relates to devices for opposing resilient resistance to the movements of bodies due to their own inertia, and more particularly to a suspension device for a vehicle-body, the object of which is to relieve the supporting-springs of said body from undue shock or strain when obstacles or ruts in the road are traversed, to permit rough roads to be passed over at high speed, and to greatly reduce the rebound and oscillation of said body under the aforesaid conditions.

The invention consists in a member having a cam projection on one face, a second member having a depression on its face constructed to receive said cam projection, means for holding said faces in resilient contact, and means for rotating one of said members; also, in the combination of said members respectively with relatively movable abutments, such as a vehicle body and axle, and also in the various combinations more particularly pointed out in the claims.

In the accompanying drawings, Figure 1 is a side elevation showing a portion of a vehicle-spring and axle and a portion of the vehicle-body with my suspension device interposed between said body and axle. Fig. 2 is a top view of my device, showing one of its annular rubber springs in section. Fig. 3 is an end view of my device. Fig. 4 is an edge view of one of the rings having cam projections on its face, and Fig. 5 is an edge view of the other and associated ring having depressions constructed to receive said cam projections.

Similar numbers of reference indicate like parts.

1 and 2 are lever-arms of metal. Preferably integral with said arms are rings 3 and 4. On the face of ring 3 are rounded cam projections 5, and in the opposing face of ring 4 are depressions 6, constructed to receive said projections. Passing through the rings 3 and 4 is a pivot-bolt 7, threaded at one end and provided with a head 8 at the opposite end. On the bolt adjacent to the head 8 is a washer 9, and between washer 9 and the outer face of ring 4 is interposed a rubber cushion-spring 10. A similar rubber cushion-spring 11 bears against the outer face of ring 3, and outside of said spring 11 is a washer 12 and then a nut 13, which is received on the threaded portion of the pivot-bolt. Passing through the bolt outside of the nut is a pin 14, which prevents the nut working off the bolt. At the outer ends of the arms 1 and 2 are formed eyes 15 16. The eye 15 is secured by a pin in a bracket 17 on the under side of the vehicle-frame 18. The eye 16 is similarly secured in a bracket 19, attached by bolts 20 on the upper side of the vehicle-spring 21, above the axle 22.

The operation of the device is as follows: When the cam projections 5 on ring 3 are seated in the corresponding depressions in ring 4, as shown in Fig. 2, the arms 1 and 2 are spread apart, as shown in Fig. 1. This is the normal condition of affairs when the vehicle-body is supported in the usual way by its spring 21. When, however, from any cause, such as the passing over of an obstruction or the sudden descent of a wheel into a rut, the vehicle-body is caused by its inertia violently to move downward—a condition which usually imperils the supporting-springs—my suspension device at once takes the shock and protects the springs therefrom in the following manner: The descent of the vehicle-body moves the pivoted outer end of the arm 1 toward the pivoted outer end of arm 2, thus closing the arms together. The effect of this is to cause the cam projections 5 on ring 3 to run up the incline of the depressions in ring 4, thus forcing said rings apart against the resiliency of the rubber cushion-springs 10 11, to which springs the shock is imparted, and so becomes taken up. When the vehicle-body rises on the rebound, the projections 5 again seat themselves in the depressions of ring 4; but now the energy of the movement of the vehicle-body is against gravity and is considerably less than what it was before. Hence there is not sufficient power to cause the cam projections after they have become seated, as above described, to run up on the opposite side of the depressions in ring 4 to any material extent. Consequently, not only does this device at once relieve the vehicle-springs from the injurious effect of the initial shock, but it prevents that rebound of the vehicle-body beyond its normal position which tends to throw the occupants upward from their seats, or, in other words, it prevents both long and continued oscillations of the body.

The resilience of the rubber cushion-springs 10 and 11 is regulated to suit the weight of the vehicle-body and other circumstances by means of the nut 13, which when set inward obviously compresses the springs 10 11 to any desired extent. This can be done instantly by the user with the aid of an ordinary wrench.

I find by actual experiment with this device applied under full-sized practical working condition to a heavy automobile and used continuously for several weeks that it completely prevents the breakage of vehicle-springs even under the severest road shocks, that it allows of high-speed travel over obstructions and rough roads, that it materially relieves the tires, and that its adjustment and regulation can be effected easily and precisely by any unskilled user.

I claim—

1. A member having a cam projection on one face, a second member having a depression on its face constructed to receive said cam projection, means for holding said faces in resilient contact and means for rotating one of said members.

2. A member having a cam projection on one face, a second member having a depression on its face constructed to receive said cam projection, means for holding said faces in resilient contact and means for simultaneously rotating said members in relatively opposite directions.

3. A member having a cam projection on one face, a second member having a depression on its face constructed to receive said cam projection, a pivot-bolt connecting said members, springs carried by said pivot-bolt and constructed to hold said opposing faces in resilient contact and means for rotating said members on said pivot-bolt.

4. A member having a cam projection on one face, a second member having a depression on its face constructed to receive said cam projection, a spring for holding said faces in resilient contact, means for rotating one of said members and means for varying the resiliency of said spring.

5. A member having a cam projection on one face, a second member having a depression on its face constructed to receive said cam projection, a pivot-bolt connecting said members, a spring carried by said bolt and constructed to hold said opposing faces in resilient contact, means for rotating one of said members on said pivot-bolt, and means carried by said bolt for varying the resiliency of said spring.

6. Two lever-arms, a pivot-bolt passing through the corresponding ends of both of said arms, a cam projection on the face of one arm and a depression on the opposing face of the other arm constructed to receive said projection and means carried by said bolt for holding said opposing faces in resilient contact.

7. Two lever-arms, a ring carried by one arm having a cam projection on its face, a ring carried by the other arm having a depression on its face constructed to receive said cam projection, a pivot-bolt passing through said rings and bodies of elastic material interposed between abutments on said bolt and the outer faces of said rings.

8. Two lever-arms, a ring carried by one arm having a cam projection on its face, a ring carried by the other arm having a depression on its face constructed to receive said cam projection, a pivot-bolt passing through said rings, and bodies of elastic material interposed between abutments on said bolt and the outer faces of said rings; the said arms when said cam projection is seated in said depression being disposed relatively at an angle.

9. Two lever-arms, a ring carried by one arm having a cam projection on its face, a ring carried by the other arm having a depression on its face constructed to receive said cam projection, a pivot-bolt passing through said rings, bodies of elastic material supported on said bolt and bearing against the outer faces of said rings, and means for varying the elastic pressure of said elastic bodies upon said rings.

10. Two lever-arms, a ring carried by one arm having a cam projection on its face, a ring carried by the other arm having a depression on its face constructed to receive said cam projection, a pivot-bolt headed at one end, threaded at the opposite end and passing through said rings, bodies of elastic material supported on said bolt and bearing against the outer faces of said rings, and a nut on said threaded portion of said bolt.

11. A vehicle-body, a lever-arm having one end pivoted to said body, a ring at the other end of said arm, an axle, a second arm having one end pivoted to said axle, a ring at the opposite end of said last-named arm, one of said rings having a cam projection on its face and the other of said rings having on its face a depression constructed to receive said cam projection, springs bearing upon the outer faces of said rings and means for holding said rings and springs in contact.

12. A vehicle-body, a lever-arm having one end pivoted to said body, a ring at the other end of said arm, an axle, a second arm having one end pivoted to said axle, a ring at the opposite end of said last-named arm, one of said rings having a cam projection on its face and the other of said rings having on its face a depression constructed to receive said cam projection springs bearing upon the outer faces of said rings, means for holding said rings and springs in contact, and means for adjusting the resilience of said springs.

13. A vehicle-body, an axle, a supporting-spring for said body carried on said axle, a lever-arm having one end pivoted to said body, a ring at the other end of said arm, a second arm, a pivot-support for one end of said arm disposed on said vehicle-spring and over said axle, a ring at the opposite end of said last-named arm, one of said rings having a cam projection on its face and the other of said rings having on its face a depression constructed to receive said cam projection, springs bearing upon the outer faces of said rings and means for holding said rings and springs in contact.

In testimony whereof I have signed my name to this specification in the presence of two subscribing witnesses.

PETER H. SEERY.

Witnesses:
JAMES CLORE,
H. E. FERRIS.